United States Patent
Luschek et al.

(10) Patent No.: US 10,815,934 B2
(45) Date of Patent: Oct. 27, 2020

(54) INTEGRAL PRELOADED FORMED BRACKET FOR ATTACHMENT OF HEAT EXCHANGERS

(71) Applicant: Unison Industries, LLC, Jacksonville, FL (US)

(72) Inventors: Bernard Albert Luschek, Lebanon, OH (US); Jason Levi Burdette, Beavercreek, OH (US); Derek Thomas Dreischarf, Bellbrook, OH (US)

(73) Assignee: Unison Industries, LLC, Jacksonville, FL (US)

( * ) Notice: Subject to any disclaimer, the term of this patent is extended or adjusted under 35 U.S.C. 154(b) by 291 days.

(21) Appl. No.: 15/850,644

(22) Filed: Dec. 21, 2017

(65) Prior Publication Data
US 2019/0195137 A1 Jun. 27, 2019

(51) Int. Cl.
*F02K 3/115* (2006.01)

(52) U.S. Cl.
CPC ........ *F02K 3/115* (2013.01); *F05D 2260/213* (2013.01)

(58) Field of Classification Search
CPC . F02K 3/105; F02K 3/11; F02K 3/115; F02K 3/06; F02C 7/32; F02C 7/14; F28F 2275/00; F28F 2275/14; F28F 2275/146; F28F 2280/00; F28F 2280/02; F28F 1/10; F28D 2001/0273; B64D 33/02; B64D 33/08; B64D 2033/024; F04D 29/403; F05D 2260/213
See application file for complete search history.

(56) References Cited

U.S. PATENT DOCUMENTS

| | | | |
|---|---|---|---|
| 5,473,885 A | 12/1995 | Hunter, Jr. et al. | |
| 8,387,362 B2 | 3/2013 | Storage et al. | |
| 8,510,945 B2 | 8/2013 | Hand et al. | |
| 9,677,474 B2 | 6/2017 | Hundley, Jr. et al. | |
| 2006/0083607 A1 | 4/2006 | Synnott et al. | |
| 2011/0146944 A1 | 6/2011 | Hand et al. | |
| 2012/0285138 A1 | 11/2012 | Todorovic | |
| 2013/0011246 A1 | 1/2013 | Todorovic | |
| 2017/0023017 A1* | 1/2017 | Dreischarf | F04D 29/661 |
| 2017/0184029 A1 | 6/2017 | Yu | |
| 2017/0335863 A1 | 11/2017 | Dreischarf et al. | |

FOREIGN PATENT DOCUMENTS

EP          3121431 A1    1/2017

OTHER PUBLICATIONS

Bruno Robelin, Patent Examiner, Extended European Search Report issued in related European Patent Application No. 18212585.6, 9 pages, May 10, 2019, The Hague, Munich, Germany.

\* cited by examiner

*Primary Examiner* — Richard A Edgar
(74) *Attorney, Agent, or Firm* — McGarry Pair PC (57) ABSTRACT

A surface cooler assembly includes at least one surface cooler comprising surface cooler hook rails extending circumferentially the length of the surface cooler and including axially extending and radially extending portions. The surface cooler assembly also includes at least one support bracket comprising bracket hook rails extending circumferentially the length of the support bracket and including axially extending and radially extending portions. The support bracket and surface cooler are contoured in a circumferential direction. Each of the surface cooler hook rails contacts a bracket hook rail.

16 Claims, 6 Drawing Sheets

INTEGRAL PRELOADED FORMED BRACKET FOR ATTACHMENT OF HEAT EXCHANGERS

TECHNICAL FIELD

The present invention relates generally to gas turbine engine turbine oil cooling and, more specifically, to mounting brackets and systems for surface coolers used to cool oil.

BACKGROUND

Gas turbine engines are commonly provided with a circulating oil system for lubricating and cooling various engine components such as bearings, gearboxes, electrical generators, and the like. In operation, the oil absorbs a substantial amount of heat that must be rejected to the external environment in order to maintain the oil at acceptable temperatures. Electric generator oil cooling typically uses one or more air-to-oil heat exchangers sometimes in series with fuel-to-oil heat exchangers and fuel return-to-tank systems in a complex cooling network.

Compact heat exchangers, also known as brick coolers or surface coolers, have been used for this cooling. By using heat sinks typically available in gas turbine engine applications, surface coolers can effectively aid in managing various gas turbine thermal loads. For example, fan bypass ducts on high bypass turbofan aircraft engines can act as effective heat sinks for surface coolers, especially at higher altitudes where ambient air temperatures below −100° F. are not uncommon. However, the internal and external thermal loads experienced by surface coolers often result in thermal growth in excess of surrounding gas turbine engine components and structures, making mounting of surface coolers difficult. Thus, surface cooler mounting brackets and systems should provide sufficient mechanical strength while also meeting thermal growth requirements.

The information included in this Background section of the specification, including any references cited herein and any description or discussion thereof, is included for technical reference purposes only and is not to be regarded subject matter by which the scope of the invention is to be bound.

SUMMARY OF THE INVENTION

A surface cooler assembly includes at least one surface cooler comprising surface cooler hook rails extending circumferentially the length of the surface cooler and including axially extending and radially extending portions. The surface cooler assembly also includes at least one support bracket comprising bracket hook rails extending circumferentially the length of the support bracket and including axially extending and radially extending portions. The support bracket and surface cooler are contoured in a circumferential direction. Each of the surface cooler hook rails contacts a bracket hook rail.

The surface cooler assembly may include at least one surface cooler comprising surface cooler hook rails extending lengthwise the length of the surface cooler and including laterally extending and vertically extending portions. The surface cooler assembly also includes at least one support bracket comprising bracket hook rails extending lengthwise the length of the support bracket and including laterally extending and vertically extending portions. The support bracket and surface cooler are substantially planar. Each of the surface cooler hook rails contacts a bracket hook rail.

The surface cooler assembly may include a linear wave spring disposed radially between the surface cooler hook rails and the bracket hook rails.

The linear wave spring may include at least one locating feature.

A polymer wear material may be disposed on the surface cooler hook rails and the bracket hook rails.

The support bracket may include fasteners spaced apart both axially and circumferentially.

The support bracket may include diagonally aligned or circumferentially aligned stiffening ribs.

The surface cooler assembly may include an end plate located at a proximal end of the surface cooler assembly and a lock plate circumferentially fixing the end plate to the support bracket.

The surface cooler assembly may be disposed at the periphery of a fan bypass duct of a gas turbine engine.

The support bracket and the surface cooler may be substantially planar.

All of the above outlined features are to be understood as exemplary only and many more features and objectives of the structures and methods may be gleaned from the disclosure herein. Therefore, no limiting interpretation of the summary is to be understood without further reading of the entire specification, claims and drawings included herewith.

BRIEF DESCRIPTION OF THE DRAWINGS

The above-mentioned and other features and advantages of these embodiments, and the manner of attaining them, will become more apparent and the embodiments will be better understood by reference to the following description taken in conjunction with the accompanying drawings, wherein.

DETAILED DESCRIPTION

It is to be understood that the depicted embodiments are not limited in application to the details of construction and the arrangement of components set forth in the following description or illustrated in the drawings. The depicted embodiments are capable of other embodiments and of being practiced or of being carried out in various ways. Each example is provided by way of explanation, not limitation of the disclosed embodiments. In fact, it will be apparent to those skilled in the art that various modifications and variations may be made in the present embodiments without departing from the scope or spirit of the disclosure. For instance, features illustrated or described as part of one embodiment may be used with another embodiment to still yield further embodiments. Thus it is intended that the present disclosure covers such modifications and variations as come within the scope of the appended claims and their equivalents.

Embodiments of an integral preloaded formed bracket for attachment of heat exchangers are depicted in FIGS. 1-11. A surface cooler assembly includes at least one surface cooler comprising surface cooler hook rails extending circumferentially the length of the surface cooler and including axially extending and radially extending portions. The surface cooler assembly also includes at least one support bracket comprising bracket hook rails extending circumferentially the length of the support bracket and including axially extending and radially extending portions. The support bracket and surface cooler are contoured in a circumferential direction. Each of the surface cooler hook rails contacts a bracket hook rail.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the rear of the engine.

As used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Figure 1:
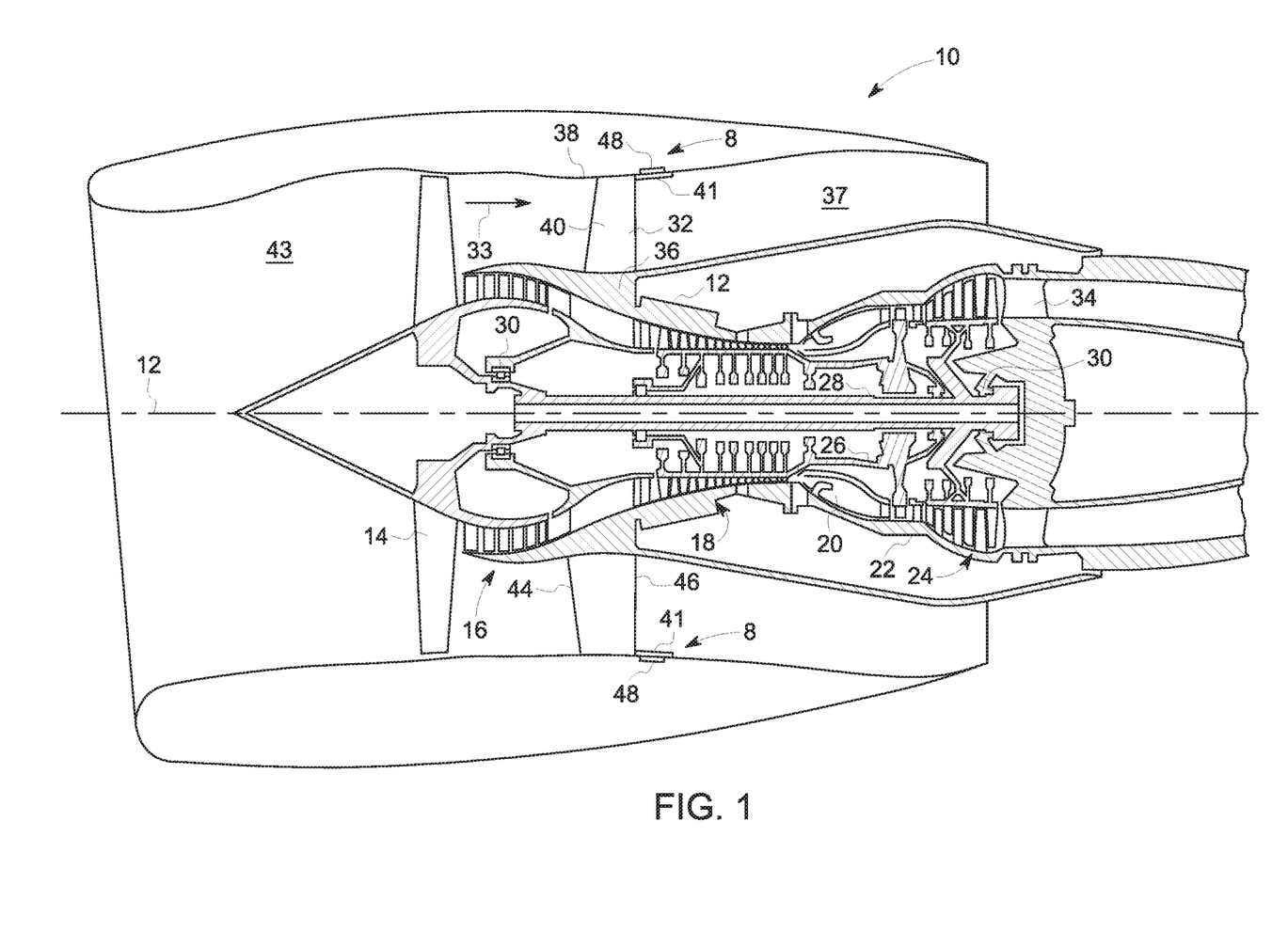
FIG. 1 is a schematic cross-sectional view illustration of a gas turbine engine incorporating a surface cooler system.
Figure 2:
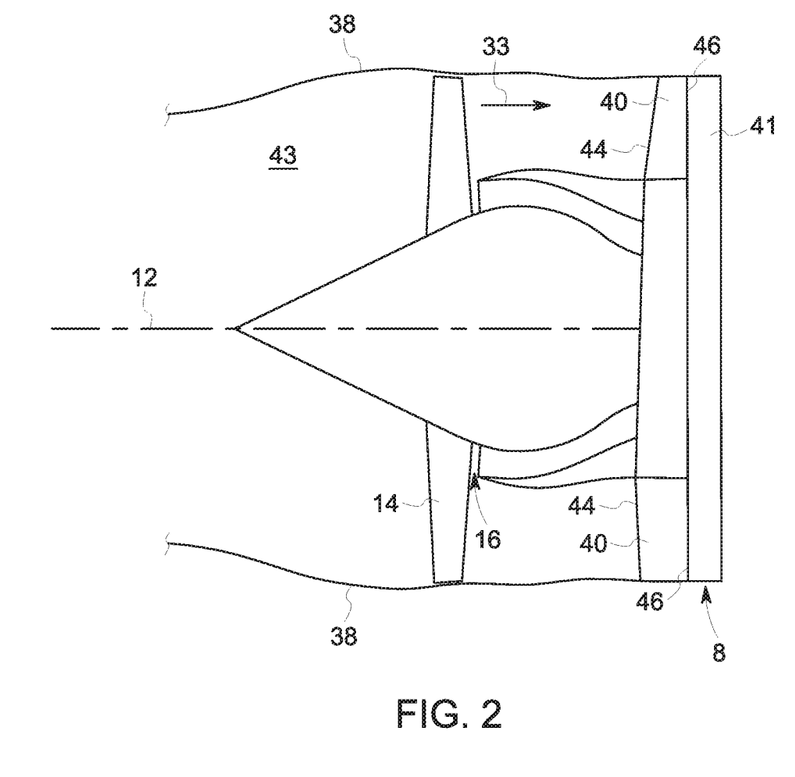
FIG. 2 is an enlarged view of a portion of the gas turbine engine of FIG. 1.

Illustrated in FIGS. 1 and 2 is a gas turbine engine ("engine") 10 incorporating a surface cooler apparatus 8 including at least one surface cooler 41 and at least one support bracket 48. The engine 10 is circumscribed about a longitudinal centerline or axis 12. The engine 10 includes, in downstream serial flow relationship, a fan 14, booster 16, compressor 18, combustor 20, high pressure turbine 22, and low pressure turbine 24. An outer shaft 26 drivingly connects the high pressure turbine to the compressor 18. An inner shaft 28 drivingly connects the low pressure turbine 24 to the fan 14 and the booster 16. The inner and outer shafts 28, 26 are rotatably mounted in bearings 30 which are themselves mounted in a fan frame 32 and a turbine rear frame 34.

The fan frame 32 includes a radially inner hub 36 connected to a radially outer annular fan casing 38 by an annular array of radially extending fan outlet guide vanes ("OGVs") 40 which extend across a fan flowpath 43. The fan OGVs 40 are downstream and aft of the fan 14 and aft of the booster 16. The exemplary embodiment of the surface cooler apparatus 8 illustrated herein is located downstream of the fan OGVs 40 fixedly attached to the annular fan casing 38 as more particularly illustrated in FIG. 2. The exemplary embodiment of the engine 10 illustrated herein includes the OGVs 40 providing aerodynamic turning of fan airflow 33 passing through a fan bypass duct 37 and structural support for the fan casing 38. Alternative embodiments may provide separate vanes and struts for aerodynamic and structural functions.

The embodiments described herein may include more than one surface cooler apparatus 8, each surface cooler apparatus including a surface cooler 41 and a support bracket 48. Each surface cooler apparatus 8 may be circumscribed around the annular fan casing 38 just downstream of the OGVs such that the one or more surface cooler apparatus 8 substantially covers 360° of the annular fan casing 38 at an axial location immediately downstream of the OGVs. Alternatively, each surface cooler apparatus 8 may cover only a portion of the annular fan casing 38. Each surface cooler apparatus 8 may be segmented or continuous. Each surface cooler apparatus 8 including one or more surface coolers 41 is used to cool oil for the engine's lubrication system for the bearings and/or for a variable frequency generator (VFG) or an integrated drive generator (IDG) oil system. One or more of the surface coolers 41 may be used to provide cooling for different engine systems or accessories. One example is a first surface cooler 41 to provide cooling for the engine's lubrication system such as for the bearings, and a second surface cooler 41 may be used to provide cooling for a variable frequency generator (VFG) or an integrated drive generator (IDG).

Referring still to FIG. 1, the OGV 40 comprises an airfoil having a leading edge 44, and a trailing edge 46 located downstream or axially aft of the leading edge 44. The one or more surface cooler apparatus 8 is located immediately downstream or axially aft of the OGV trailing edge 46, circumferentially circumscribed around the annular fan casing 38. When the engine 10 is in operation, air enters the fan flowpath 43 and passes fan 14. A first portion of the fan airflow 33 enters booster 16 where it is compressed in compressor 18 and eventually combusted in combustor 20. A second portion of the fan airflow 33 enters the fan bypass duct 37, passes OGV 40 and the one or more surface cooler apparatus 8 before exiting the gas turbine engine 10. As fan airflow 33 passes the one or more surface cooler apparatus 8, heat from the one or more surface cooler apparatus 8 is given off to the fan airflow 33 while oil within the surface cooler apparatus 8 is simultaneously cooled. It is noted that although the present claimed embodiments are described with oil as the cooling fluid within the one or more surface cooler apparatus 8, other cooling fluids such as fuel, air, water, ammonia, other fluids and mixes thereof are possible and considered to be included in the scope of the disclosed embodiments.

Referring now to FIG. 2, the one or more surface cooler apparatus 8 and the one or more surface coolers 41 are shown in a side view as extending through the full height of the annular fan casing 38. Though depicted vertically in FIG. 2, the one or more surface coolers 41 may be circumferentially circumscribed around the annular fan casing 38 at the periphery of fan flowpath 43. At least a portion of the one or more surface coolers 41 may protrude into fan flowpath 43 thereby enhancing heat transfer from the one or more surface coolers 41 to the fan airflow 33 within the fan bypass duct 37. In another embodiment, the one or more surface coolers 41 may not protrude into fan flowpath 43. In embodiments where the one or more surface coolers 41 do not protrude into fan flowpath 43, fan airflow 33 across an outer surface of the one or more surface coolers 41 at the periphery of fan flowpath 43 will also encourage heat transfer from the one or more surface coolers 41 to the fan airflow 33 and may have the additional benefit of reducing the pressure drop of the fan airflow 33 as it passes through the fan bypass duct 37, as compared to embodiments in which the one or more surface coolers 41 protrude into the fan flowpath 43.

Figure 3:
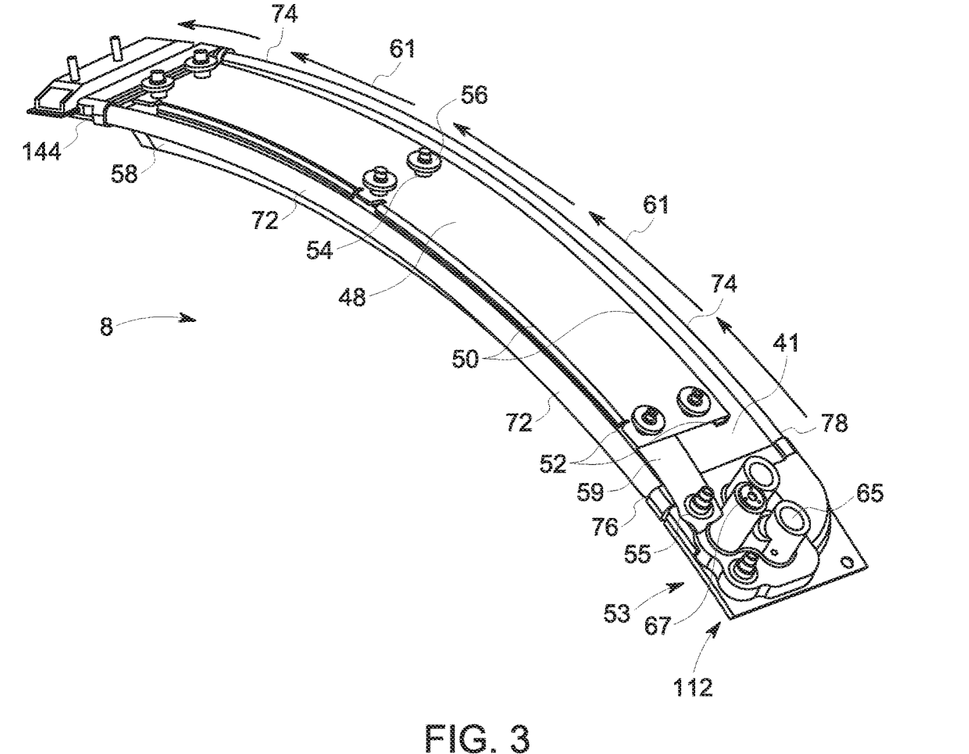
FIG. 3 is an illustration of a segmented surface cooler and mounting bracket.

FIG. 3 illustrates an exemplary embodiment of the one or more surface cooler apparatus 8. In this exemplary embodiment, a segmented surface cooler 41 is illustrated, the segmented surface cooler 41 includes curvature in a circumferential direction thereby conforming with the curvature of the annular fan casing 38. The segmented surface cooler 41 may include a plurality of fins 58 for enhancing heat transfer. The plurality of fins 58 may protrude into the fan flowpath 43 or alternatively the plurality of fins 58 may instead be located at the periphery of the fan flowpath 43. In both embodiments, (protruding and not protruding into the fan flowpath 43) fan airflow 33 flowing across the plurality of fins 58 enhances heat transfer from the surface cooler 41 to the fan airflow 33 as it passes through the fan bypass duct 37.

The surface cooler apparatus 8 includes a surface cooler endplate 53 including a surface cooler inlet manifold 65 and surface cooler outlet manifold 67. The surface cooler inlet and outlet manifolds, 65 and 67, route oil and/or other cooling fluids into and out of the surface cooler. The surface cooler inlet manifold 65 is fluidly connected to a surface cooler hot side plenum 72 at a surface cooler hot side fluid connection 76. The surface cooler hot side plenum 72 runs the length of the surface cooler 41 in a circumferential direction. Similarly, the surface cooler outlet manifold 67 is fluidly connected to a surface cooler return plenum 74 at a surface cooler return fluid connection 78. The surface cooler return plenum 74 runs the length of the surface cooler 41 in a circumferential direction. The surface cooler hot side plenum 72 is depicted as axially fore of the surface cooler return plenum 74. However, embodiments in which the surface cooler hot side plenum 72 is axially aft of the surface cooler return plenum 74 are also possible.

Referring still to FIG. 3, the surface cooler apparatus 8 includes a support bracket 48 including a plurality of bracket hook rails 50. The support bracket 48 may be contoured to match the shape of the surface cooler 41. In particular, the support bracket 48 may be evenly contoured in a circumferential direction through the full length of the support bracket 48. The plurality of bracket hook rails 50 run the length of the support bracket 48 in a circumferential direction. A first bracket hook rail of the plurality of bracket hook rails 50 is located along an axially fore edge of the support bracket 48. A second bracket hook rail of the plurality of bracket hook rails 50 is located along an axially aft edge of the support bracket 48.

The surface cooler 41 includes a plurality of surface cooler hook rails 52. The plurality of surface cooler hook rails 52 run the length of the surface cooler 41 in a circumferential direction. A first surface cooler hook rail of the plurality of surface cooler hook rails 52 is located along an axially fore edge of the surface cooler 41. A second surface cooler hook rail of the plurality of surface cooler hook rails 52 is located along an axially aft edge of the surface cooler 41. The plurality of surface cooler hook rails 52 interface with the plurality of bracket hook rails 50. In particular, the interface between the plurality of bracket hook rails 50 and the plurality of surface cooler hook rails 52 extends circumferentially and allows for relative circumferential movement between the surface cooler 41 and the support bracket 48. The interface between the plurality of bracket hook rails 50 and the plurality of surface cooler hook rails 52 prohibits relative movement between the surface cooler 41 and the support bracket 48 in both the axial and radial directions.

The support bracket 48 includes a plurality of bolts 54 and a plurality of lock nuts 56. The plurality of bolts 54 and plurality of locknuts 56 attach the support bracket 48 to the annular fan casing 38. The plurality of bolts 54 and the plurality of lock nuts 56 are located at multiple circumferential and multiple axial locations, thereby fixedly attaching the support bracket 48 to the annular fan casing 38 and preventing relative movement therebetween. A lock plate 59 attaches the support bracket 48 to the surface cooler end plate 53 via at least one surface cooler locating post 55, the surface cooler locating post 55 extending radially outward from the surface cooler end plate 53. In some embodiments, the lock plate 59 will be integral with the support bracket 48. In other embodiments, the lock plate 59 may be a separate component. In every embodiment, the lock plate 59 fixes the circumferential position of the surface cooler end plate 53 which is fixed in all degrees of freedom to ensure integral manifold features allowing for the routing of fluids into and out of the surface cooler 41

During operation of the engine 10, the surface cooler 41 heats up relative to surrounding engine components and structures. As a result, the surface cooler 41 thermally expands. Because the surface cooler 41 is fluidly and mechanically coupled to the end plate 53 at the surface cooler hot side fluid connection 76 and the surface cooler return fluid connection 78, a proximal end of the surface cooler 112 is circumferentially fixed to the end plate. As the surface cooler 41 thermally expands during operation of the engine 10, the proximal end of the surface cooler 112 remains fixed to the end plate 53 while a distal end of the surface cooler 114 expands in a direction of expansion 61. The distal end of the surface cooler 114 is not circumferentially fixed and therefore circumferentially "floats," allowing for expansion in the direction of expansion 61. The direction of expansion 61 is substantially circumferential. The circumferential interface between the plurality of bracket hook rails 50 and the plurality of surface cooler hook rails 52 restrict the thermal expansion of surface cooler 41 to only the circumferential direction, while simultaneously providing support to the surface cooler 41 in both the axial and radial directions. However, misalignments of the surface cooler apparatus 8 and uneven thermal expansion as well as other factors may cause the direction of expansion 61 to deviate from the circumferential direction.

Figure 4:
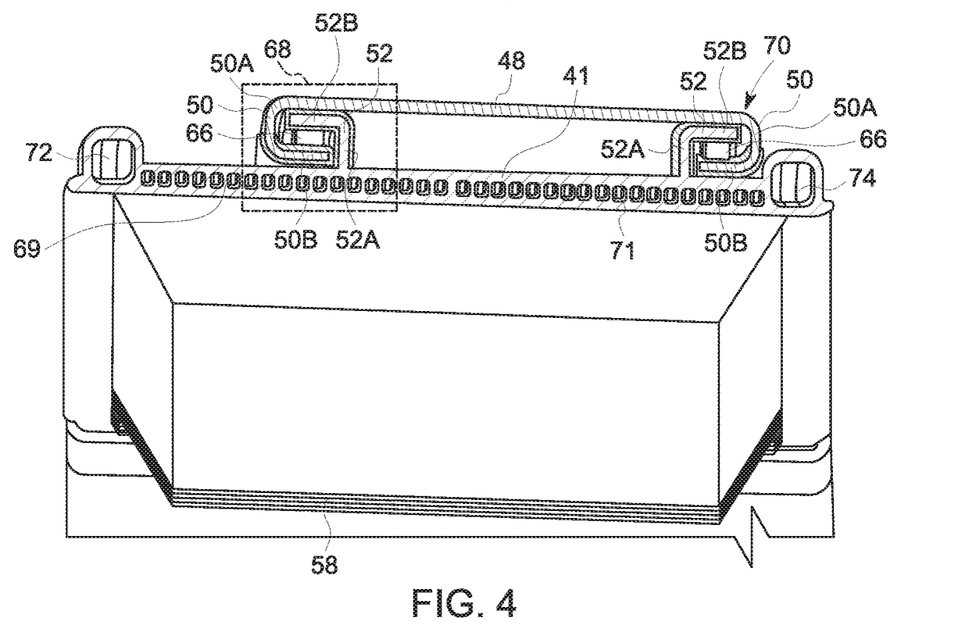
FIG. 4 is a side view of the surface cooler and mounting bracket illustrated in FIG. 3.

FIG. 4 illustrates the circumferential interface between the plurality of bracket hook rails 50 and the plurality of surface cooler hook rails 52, in greater detail. A linear wave spring 66 is radially located between each of the of bracket hook rails 50 and surface cooler hook rails 52. The linear wave spring is circumferentially aligned and spans the full length of the circumferential interface between the bracket hook rails 50 and the surface cooler hook rails 52. Both the interface between the bracket hook rail 50 and surface cooler hook rail 52 at the bracket fore end 68 as well as the interface between the bracket hook rail 50 and surface cooler hook rail 52 at the bracket aft end 70 include a linear wave spring radially located therebetween.

Figure 8:
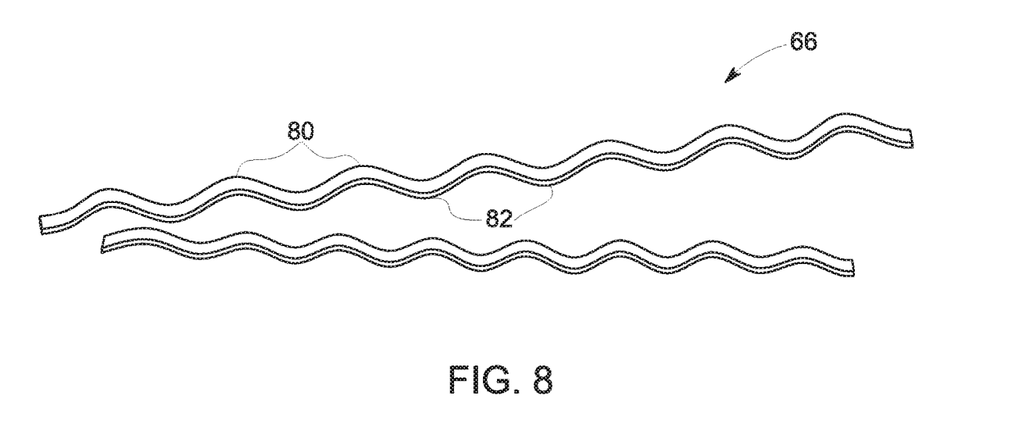
FIG. 8 is an illustration of a linear wave spring per the present embodiments.

As illustrated in FIG. 8, the linear wave spring 66 includes a plurality of peaks 80 and a plurality of nadirs 82, which collectively serve to pre-load the interface between the surface cooler 41 and the support bracket 48. Each of the peaks 80 of the linear wave spring 66 contacts an underside radially inward-facing portion of the surface cooler hook rail 52 and applies a radially-outward force to the surface cooler hook rail 52. Similarly, each of the nadirs 82 of the linear wave spring 66 contacts a radially outward-facing portion of the bracket hook rail 50 and applies a radially-inward force to the bracket hook rail 50. The pre-loaded interface provided by the linear wave spring 66 to the interface between each of the surface cooler hook rails 52 and the bracket hook rails 50 provides frictional damping, thereby reducing or eliminating vibration between the surface cooler 41 and the support bracket 48.

The wave configuration of the linear wave spring 66 allows it to compress and expand in a radial direction when assembled, allowing it to act as a spring, thereby pre-loading the interface between the surface cooler 41 and support bracket 48, at the respective hook rails. The linear wave spring 66 applies an expansive force only along a radially-oriented axis which restricts relative axial movement between the surface cooler 41 and the support bracket 48 while simultaneously allowing circumferential movement. Because each of the plurality of peaks 80 and nadirs 82, which are located throughout the length of the linear wave spring 66, contacts the respective portions of the surface cooler hook rail 52 and bracket hook rail 50, the preloading force can be distributed over the entire circumferential lengths of the surface cooler 41 and support bracket 48, rather than being concentrated in localized areas. The linear wave spring 66 is located radially between the surface cooler hook rails 52 and the bracket hook rails 50, as described in the embodiments above. However, other configurations are possible. For example, the linear wave spring 66 may be radially outward of and immediately adjacent to the surface cooler 41 radially outward facing surface. In this configuration, each of the nadirs 82 of the linear wave spring 66 contacts the surface cooler 41 radially outward facing surface while each of the peaks 80 of linear wave spring 66 contacts an underside of the axially extending portion of the bracket hook rail 50, which in turn is located radially inward of the axially extending portion of the surface cooler hook rail 52.

Referring again to FIG. 4, the surface cooler hook rails 52 each include a radially extending portion which extends radially outward from the radially outward face of the surface cooler 41 and connect to an integral axially extending portion. Similarly, the bracket hook rails 50 each include a radially extending portion and an axially extending portion. In the embodiment shown in FIG. 4, the surface cooler hook rails 52 are axially inward of the respective bracket hook rails 50. However, as is illustrated in the embodiment shown in FIG. 6, the surface cooler hook rails 52 may also be axially outward of the respective bracket hook rails 50. In either configuration, axial motion between the surface cooler 41 and support bracket 48 is restricted because the radially extending portion of each of the bracket hook rails 50 contacts the axially extending portion of each of the surface cooler hook rails 52 as the axially extending portion of each of the bracket hook rails 50 simultaneously contacts the radially extending portion of each of the surface cooler hook rails 52.

Also illustrated in FIG. 4 are a plurality of hot side channels 69 located axially fore of a plurality of return channels 71. In other configurations, the plurality of hot side channels 69 may be located axially aft of the plurality of return channels 71. The plurality of hot side channels 69 are in fluid communication with the plurality of return channels 71. As hot cooling fluid flows through the plurality of hot side channels 69, the cooling fluid exchanges heat with fan airflow 33 as the fan airflow 33 flows across the radially inner surface of the surface cooler 41. The cooling fluid then flows into the plurality of return channels 71 and eventually through the surface cooler outlet manifold 67. As a result, the cooling fluid will experience a temperature drop as it flows from the plurality of hot side channels 69 to the plurality of return channels 71. Both the plurality of hot side channels 69 and the plurality of return channels 71 are circumferentially aligned and run the full circumferential length of the surface cooler 41.

At the axially fore end of the surface cooler 41, a surface cooler hot side plenum 72 extends circumferentially through the length of the surface cooler 41, as illustrated in FIG. 4. The cooling fluid flows through the surface cooler hot side plenum 72, which has a greater flow area than each flow channel of the plurality of hot side channels 69. The surface cooler hot side plenum 72 runs parallel to and is fluidly coupled to the plurality of hot side channels 69. This configuration allows the surface cooler hot side plenum 72 to provide a flow circuit with reduced resistance to flow as compared to the plurality of hot side channels 69 alone. As a result, the surface cooler hot side plenum 72 reduces the likelihood of clogging that may occur within the surface cooler 41 at various operating conditions. In addition, because the flow area of the surface cooler hot side plenum 72 is greater than that of each flow channel of the plurality of hot side channels 69, the accumulated thickness of the material defining the surface cooler hot side plenum 72 is also greater, thereby increasing the overall stiffness of the surface cooler.

At the axially aft end of the surface cooler 41, a surface cooler return plenum 74 extends circumferentially through the length of the surface cooler 41, as illustrated in FIG. 4. The cooling fluid flows through the surface cooler return plenum 74, which has a greater flow area than the flow area of each flow channel of the plurality of return channels 71. The surface cooler return plenum 74 runs parallel to and is fluidly coupled to the plurality of return channels 71. This configuration allows the surface cooler return plenum 74 to provide a flow circuit with increased flow area and reduced resistance to flow as compared to the plurality of return channels 71 alone. As a result, the surface cooler return plenum 74 reduces the likelihood of clogging that may occur within the surface cooler 41 at various operating conditions. In addition, because the flow area of the surface cooler return plenum 74 is greater than that of each flow channel of the plurality of return channels 71, the accumulated thickness of the material defining the surface cooler return plenum 74 is also greater, thereby increasing the overall stiffness of the surface cooler.

Still referring to FIG. 4, a plurality of surface cooler fins 58 extend radially inward from the plurality of hot side channels 69 and the plurality of return channels 71. The surface cooler fins 58 may be configured in any shape, orientation, angle, length, spacing, or material as dictated by the specific design requirements. The plurality of surface cooler fins 58 are illustrated in FIG. 4 as a three-dimensional solid occupying the space that the plurality of surface cooler fins 58 and spacings therebetween would occupy. One or more details of the plurality of surface cooler fins 58 have been omitted from FIG. 4

Figure 5:
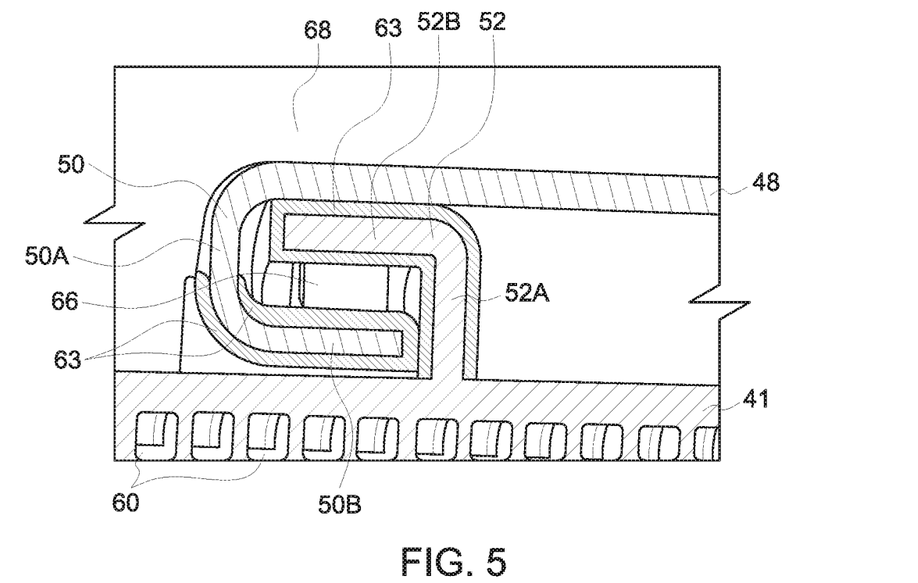
FIG. 5 is an enlarged view of the surface cooler and mounting bracket illustrated in FIG. 4.

FIG. 5 illustrates an expanded view of an exemplary embodiment of the interface between the surface cooler hook rail 52 and the bracket hook rail 50, at the bracket fore end 68. A wear surface 63 is disposed on the axially and radially extending portions of the surface cooler hook rail 52 and the bracket hook rail 50. The wear surface 63 reduces metal-on-metal contact between the portions of the surface cooler hook rail 52 and the bracket hook rail 50. The wear surface may be composed of a polymer material such as a thermoplastic polymer such as polyether ether ketone (PEEK) or other suitable materials that include a melting point in a range from about 250° C. to about 500° C. Suitable materials include compositions that are resistant to thermal degradation and have a tensile strength in a range from about 60 MPa to about 150 MPa or more specifically from about 80 MPa to 120 MPa, or even more specifically from about 90 MPa to 105 MPa.

The wear surface 63 may also be composed of materials with a glass transition temperature from about 100° C. to about 200° C., or more specifically from about 120° C. to about 180° C., or even more specifically from about 130° C. to about 165° C. Because suitable wear surface material is resistant to thermal degradation, the wear surface 63 is able to maintain mechanical properties at elevated environmental and/or engine operating temperature. In addition, because suitable wear surface material has sufficient tensile strength, the wear surface 63 will not lose structural integrity even when exposed to stresses from circumferential thermal growth of the surface cooler 41, the pre-loading of the surface cooler 41 with the support bracket 48, and from other sources.

Figure 6:
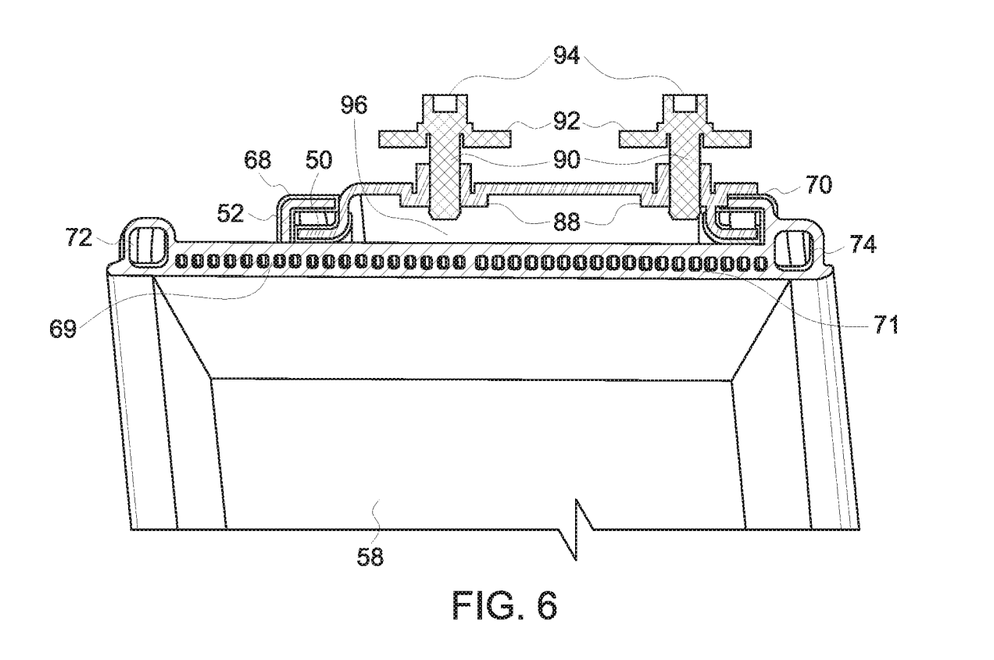
FIG. 6 is an enlarged view of the surface cooler and mounting bracket illustrated in FIG. 4.

Referring to FIG. 6, the support bracket 48 includes a plurality of bolts 54 and lock nuts 56. The support bracket 48 includes a plurality of threaded sleeves 88 with internal threads for receiving a bolt first portion 90. The threaded sleeves 88 may be formed integrally with the support bracket 48 or may be machined, welded or brazed in after the fact, or formed from any other suitable process. Each bolt 54 also includes a top hat portion 92 and a threaded top portion 94. In one embodiment, the threaded top portion is internally threaded for receiving a bolt or fastener for attaching the support bracket 48 to the annular fan casing 38. In another embodiment, the threaded top portion is externally threaded to be received by an internally threaded portion of the annular fan casing 38.

Referring still to FIG. 6, a radial space 96 between any portion of the plurality of bolts 54 and lock nuts 56 and the radially outward facing surface of the surface cooler 41 allows the support bracket 48 to both be thermally decoupled from the surface cooler 41, but also allows the surface cooler 41 to thermally expand in the circumferential direction 61 while the support bracket 48 remains circumferentially fixed to the annular fan casing 38. The attachment configurations of the support bracket 48 to the annular fan casing 38 described herein do not represent an exhaustive description of possible attachment means. Other equivalent and suitable attachment configurations exist and are considered to be within the scope of this disclosure. However, and of noted importance, the plurality of bolts 54 and lock nuts 56 attach only to the support bracket 48 and annular fan casing 38 and do not attach to the surface cooler 41, enabling the aforementioned surface cooler 41 thermal growth.

Figure 7:
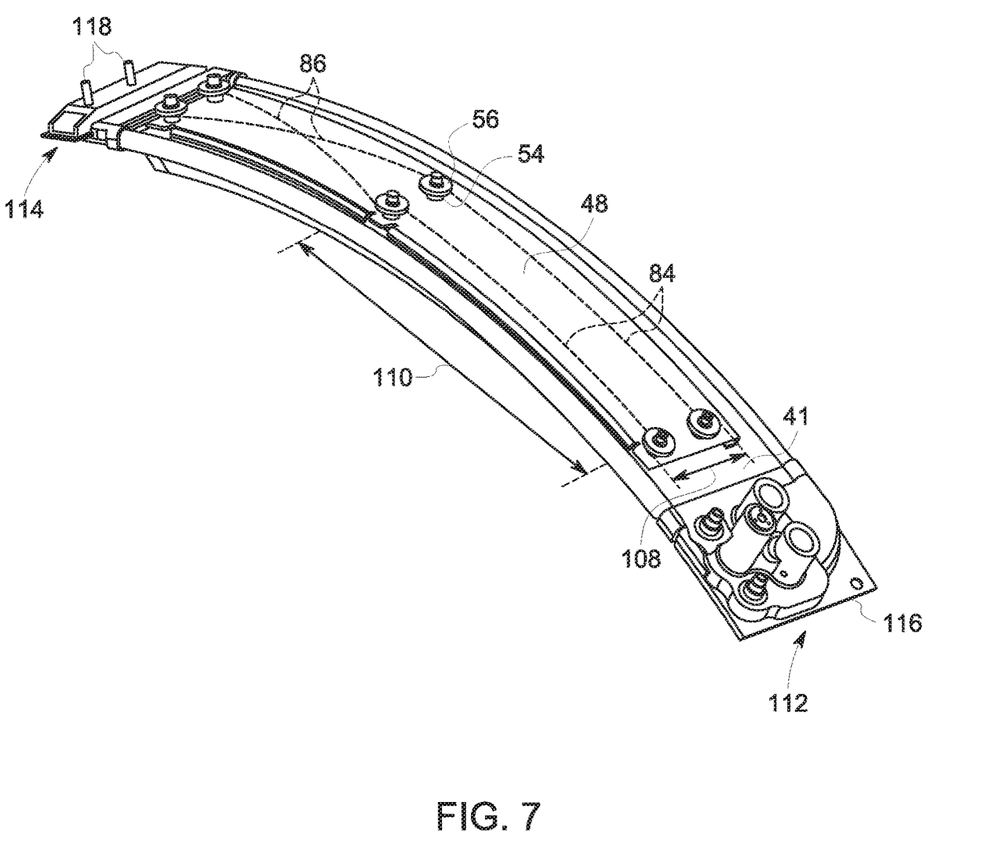
FIG. 7 is an illustration of a segmented surface cooler and mounting bracket including stiffening ribs.

Referring to FIG. 7, the support bracket 48 may include one or more diagonal stiffening ribs 86, and/or circumferential stiffening ribs 84. The one or more diagonal and circumferential stiffening ribs, 86 and 84 respectively, are aligned between lock nuts 56 and bolts 54 that are spaced apart axially 108, circumferentially 110, or both. The one or more diagonal and circumferential stiffening ribs, 86 and 84 respectively are areas of localized thickness of the support bracket 48 which provide the support bracket 48 increased rigidity and mechanical strength. The one or more diagonal and circumferential stiffening ribs, 86 and 84 respectively, may be formed to be integral with the support bracket 48, or may be machined, welded or brazed on after the fact, or formed from any other suitable process, including during an incremental forming die process.

Referring still to FIG. 7, at a surface cooler apparatus proximal end 112, the end plate 53 may include a first plurality of interface features 116 for attaching to a second plurality of interface features 118 at a surface cooler apparatus distal end 114, of an adjacent surface cooler. In this manner, multiple surface cooler apparati 8 may be connected in series, each surface cooler apparatus 8 spanning an arc segment of the circumference of the annular fan casing 38. The multiple surface cooler apparati 8 may be arranged to be in fluid communication with each other or alternatively may be arranged to each be a stand-alone, closed-loop surface cooler apparati 8. In arrangements where the multiple surface cooler apparati 8 are in fluid communication, the lock plate 59 which circumferentially fixes the proximal end 112 of the surface cooler 41 to the end plate 53, is only included in the first one of the multiple surface cooler apparati 8, allowing the distal end 114 of each successive surface cooler apparatus 8 to float circumferentially as a result of thermal growth. In arrangements where the multiple surface cooler apparati 8 are arranged as stand-alone systems, the surface coolers 41 may be controlled so as to operate independently as necessary to accommodate the various thermal loads of the gas turbine engine 10.

Figure 9:
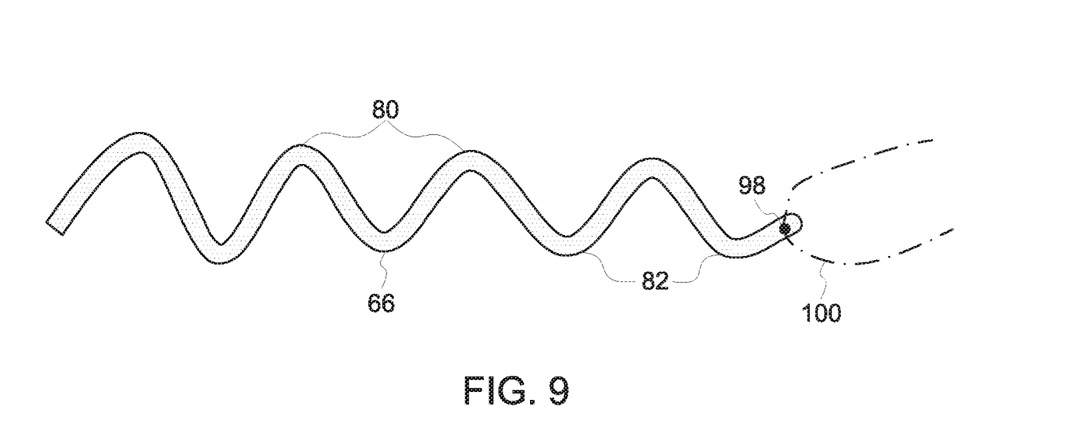
FIG. 9 is an illustration of a linear wave spring per the present embodiments.

Referring to FIG. 9, the linear wave spring 66 may include a locating hole 98 at one end. A wire 100 may be looped through the locating hole 98 in order to pull the linear wave spring into place radially between the bracket hook rails 50 and the surface cooler hook rails 52.

Figure 10:
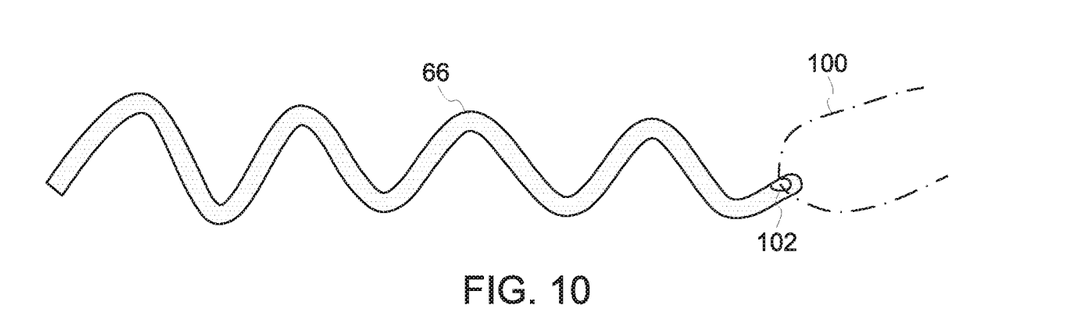
FIG. 10 is an illustration of a linear wave spring per the present embodiments.

Referring to FIG. 10, the linear wave spring 66 may include a locating notch 102 at one end. The wire 100 may be looped around the locating notch in order to pull the linear wave spring into place radially between the bracket hook rails 50 and the surface cooler hook rails 52. A groove, hook and/or other locating feature may also be used rather than a locating hole 98 or locating notch 102, in order to place the linear wave spring. Similarly, a winch or pliers may be used instead of the wire 100 for positioning the linear wave spring 66. In another embodiment, if the linear wave spring 66 is rigid enough, it may be possible to push the linear wave spring 66 into place between the bracket hook rails 50 and the surface cooler hook rails 52.

Figure 11:
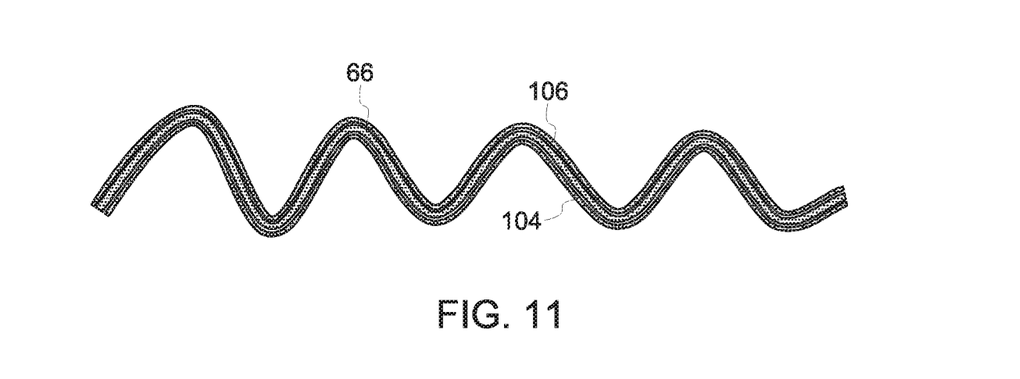
FIG. 11 is an illustration of a linear wave spring per the present embodiments.

Referring to FIG. 11, the linear wave spring 66 may include lubricant 104 on the peaks 80 and adhesive 106 on the nadirs 82, or vice versa. In this embodiment, the linear wave spring is adhered to either the bracket hook rail 50 or the surface cooler hook rail 52, and then circumferentially slid into position allowing the lubricant to act on the opposing surface to the surface to which the adhesive has been applied. The lubricant 104 and adhesive 106 illustrated in FIG. 11 allow the linear wave spring to be positioned radially between the bracket hook rails 50 and the surface cooler hook rails 52 without the need for locating features.

The above disclosure describes embodiments in which a surface cooler 41 and support bracket 48 are contoured or curvilinear. However, the disclosure applies in equal measure to embodiments that are substantially flat or planar. For example, a substantially flat or planar surface cooler 41 having surface cooler hook rails 52 running the full length of the surface cooler 41 can interface with a linear wave spring 66 and support bracket 48 with bracket hook rails 50 aligned through the full length of the support bracket 48, as described above. In such configurations, relative motion between the planar surface cooler 41 and support bracket 48 would be restricted in the width-wise or lateral and height-wise or vertical directions, and unrestricted in a length-wise direction. The surface cooler 41 may be fixed to the support bracket 48 at a proximal end 112 using a lock plate 59, allowing the distal end 114 of the surface cooler 41 to float and expand in a length-wise direction as a result of thermal growth, as described above.

The components described above may be composed of any suitable materials. For example, support bracket 48 may be composed of titanium, aluminum, compounds thereof, composite materials or other suitable material. The linear wave spring 66 may be composed of at least one of 17-7 stainless steel, A286 and/or other suitable materials. The surface cooler 41 may be composed of aluminum, titanium, nickel-based superalloys, compounds thereof, and other suitable materials.

The components described above may be formed using any suitable manufacturing processes. For example, the support bracket 48 may be formed using an incremental forming process such as by using a multi-step or progressive die in which during a first die process the curvature or radius in the circumferential direction 61 is formed, and during a second die process the axially-aligned and radially-aligned portions of the bracket hook rails 50 are formed. The support bracket 48 may also be formed using additive manufacturing or 3-D printing. Strengthening features such as circumferential stiffening ribs 84 and diagonal stiffening ribs 86 may be formed in the support bracket 48 via additive manufacturing or alternatively they may be stamped or gusseted in.

The surface cooler 41 may be formed using additive manufacturing or 3-D printing. The surface cooler 41 may also be formed using investment casting, either as a single casting or as multiple castings which are subsequently brazed together. The surface cooler hook rails 52 may be formed from extruded aluminum, or incrementally formed as described above.

The surface cooler apparatus 8 including a surface cooler 41 and support bracket 48 has been described in terms of one possible application on gas turbine engines. However, the embodiments disclosed herein may also be utilized in other applications. For example, in applications where it is desired to mount or provide structural support for a surface cooler or heat exchanger, the embodiments described herein allow for relative motion between the surface cooler and a support bracket in a first direction while restricting relative motion in both a second direction and a third direction. This arrangement enables design flexibility to allow for such factors as thermal expansion, variability of material properties and as well as other factors.

The foregoing description of several embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

Accordingly, what is desired to be secured by Letters Patent of the United States is the invention as defined and differentiated in the following claims:

1. A surface cooler assembly, comprising:
   at least one surface cooler, the at least one surface cooler comprising at least two surface cooler hook rails, the at least two surface cooler hook rails extending the length of the surface cooler in a circumferential direction, each of the at least two surface cooler hook rails comprising at least one axially extending portion and at least one radially extending portion;
   at least one support bracket, the at least one support bracket comprising at least two bracket hook rails, the at least two bracket hook rails extending the length of the support bracket in a circumferential direction, each of the at least two bracket hook rails comprising at least one axially extending portion and at least one radially extending portion, wherein the at least one support bracket and the at least one surface cooler are contoured in a circumferential direction, and wherein a portion of each of the at least two surface cooler hook rails contacts a portion of each of the at least two bracket hook rails; and
   at least one linear wave spring, the at least one linear wave spring disposed radially between the at least two surface cooler hook rails and the at least two bracket hook rails.

2. The surface cooler assembly as claimed in claim 1, the at least one linear wave spring further comprising:
   a plurality of peaks; and
   a plurality of nadirs, wherein each of the plurality of peaks contacts the at least two surface cooler hook rails, and wherein each of the plurality of nadirs contacts the at least two bracket hook rails.

3. The surface cooler assembly as claimed in claim 2, wherein the at least one axially extending portion of the at least two bracket hook rails contacts the at least one radially extending portion of the at least two surface cooler hook rails, and wherein the at least one axially extending portion of the at least two surface cooler hook rails contacts the at least one radially extending portion of the at least two bracket hook rails.

4. The surface cooler assembly as claimed in claim 3, further comprising:
   a thermoplastic polymer wear material disposed on at least one of the more than one surface cooler hook rails and the more than one bracket hook rails;
   a plurality of fasteners disposed on the at least one support bracket, the plurality of fasteners spaced apart both axially and circumferentially;
   at least one stiffening rib, the at least one stiffening rib disposed in the at least one support bracket between two of the plurality of fasteners;
   an end plate, the end plate located at a proximal end of the surface cooler assembly; and
   a lock plate, the lock plate connecting a proximal end of the at least one support bracket to the end plate, wherein the plurality of fasteners attach to an annular fan casing of a gas turbine engine, wherein the surface cooler assembly is disposed at a periphery of a fan bypass duct, and wherein the at least one surface cooler is located radially inward of the at least one support bracket.

5. The surface cooler assembly as claimed in claim 2, the at least one linear wave spring further comprising:
   at least one locating feature for locating the at least one linear wave spring radially between the each of the at least two bracket hook rails and each of the at least two surface cooler hook rails, wherein the at least one locating feature is disposed on a proximal end of the at least one linear wave spring.

6. The surface cooler assembly as claimed in claim 5, wherein the at least one locating feature is at least one of a hook, notch, hole or groove.

7. The surface cooler assembly as claimed in claim 1, wherein a wear material is disposed on at least one of the at least two surface cooler hook rails and the at least two bracket hook rails.

8. The surface cooler assembly as claimed in claim 7, wherein the wear material is composed of a thermoplastic polymer.

9. The surface cooler assembly as claimed in claim 8, wherein the wear material has a tensile strength between 60 MPa and 150 MPa, and wherein the wear material has a glass transition temperature between 100° C. and 200° C.

10. The surface cooler assembly as claimed in claim 1, the at least one support bracket further comprising a plurality of fasteners, the plurality of fasteners spaced apart both axially and circumferentially.

11. The surface cooler assembly as claimed in claim 10, the at least one support bracket further comprising at least one stiffening rib, wherein the at least one stiffening rib is disposed between two of the plurality of fasteners, and wherein the at least one stiffening rib is diagonally aligned or circumferentially aligned.

12. The surface cooler assembly as claimed in claim 11, further comprising at least one diagonally aligned stiffening rib and at least one circumferentially aligned stiffening rib.

13. The surface cooler assembly as claimed in claim 1, further comprising:
   an end plate, the end plate located at a proximal end of the surface cooler assembly, the end plate in fluid communication with the surface cooler, the end plate comprising at least one inlet manifold and at least one outlet manifold; and
   a lock plate, the lock plate connecting a proximal end of the at least one support bracket to the end plate, the lock plate circumferentially fixing the end plate to the support bracket, wherein the at least one inlet manifold routes cooling fluid into the surface cooler, and wherein the at least one outlet manifold routes cooling fluid out of the surface cooler.

14. The surface cooler assembly as claimed in claim 13, the end plate further comprising at least one interface feature, the at least one interface feature attaching the end plate to a distal end of an adjacent surface cooler assembly.

15. The surface cooler assembly as claimed in claim 1, the at least one support bracket further comprising a plurality of fasteners, the plurality of fasteners attaching to a component of a gas turbine engine.

16. The surface cooler assembly as claimed in claim 15, wherein each fastener of the plurality of fasteners attaches to an annular fan casing of the gas turbine engine, wherein the surface cooler assembly is disposed at a periphery of a fan bypass duct, and wherein the at least one surface cooler thermally expands in a circumferential direction when the gas turbine engine is in operation.

* * * * *